No. 790,392. PATENTED MAY 23, 1905.
E. F. PRICE.
PROCESS OF PRODUCING FERROCHROMIUM.
APPLICATION FILED AUG. 31, 1904.
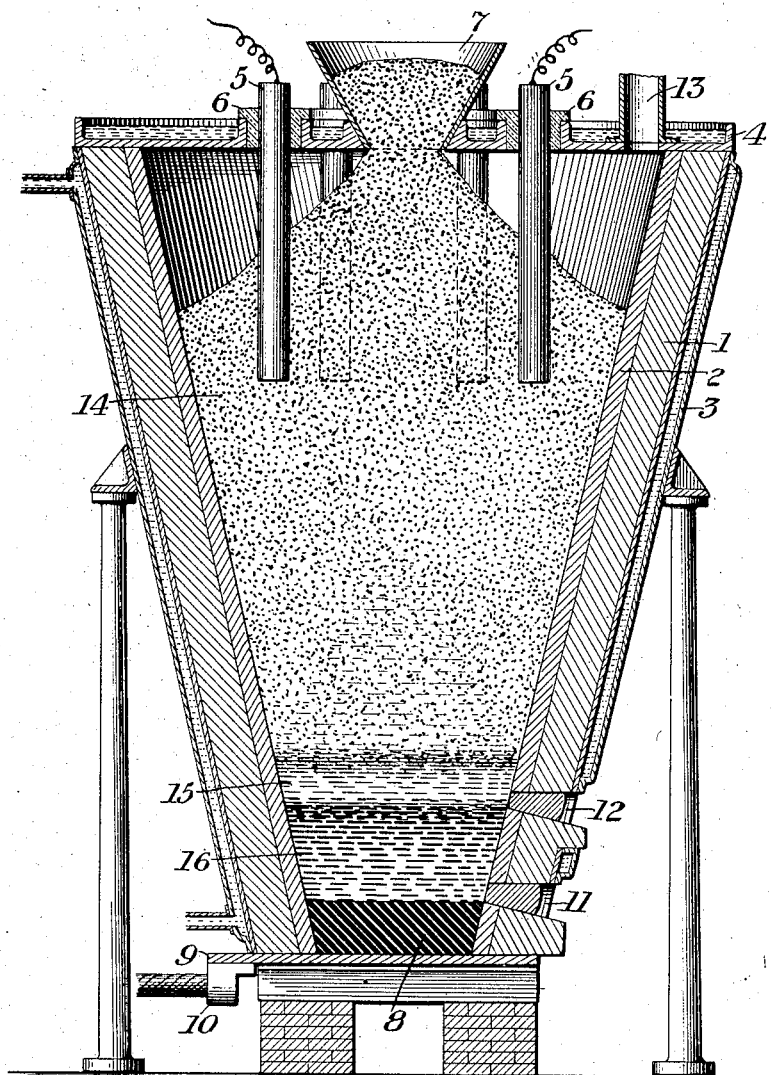
Witnesses:
R A Balderson
Julia B Hill
Inventor:
Edgar F. Price,
by Byrnes & Townsend,
Att'ys.

No. 790,392. Patented May 23, 1905.

UNITED STATES PATENT OFFICE.

EDGAR F. PRICE, OF NIAGARA FALLS, NEW YORK.

PROCESS OF PRODUCING FERROCHROMIUM.

SPECIFICATION forming part of Letters Patent No. 790,392, dated May 23, 1905.

Application filed August 31, 1904. Serial No. 222,892.

*To all whom it may concern:*

Be it known that I, EDGAR F. PRICE, a citizen of the United States, residing at Niagara Falls, in the county of Niagara and State of New York, have invented certain new and useful Improvements in Processes of Smelting Metallic Compounds and Producing Ferrochromium, of which the following is a specification.

In the production of ferrochromium from chromite it is customary to introduce a small charge of the ore, carbon, and a flux into an electric furnace having sides and a hearth of carbon and to spring an arc between the hearth and a depending carbon electrode having its lower end embedded in the charge. The potential difference usually maintained between the terminals of the furnace is one hundred and ten volts. As the ore is reduced a layer of the ferrochromium accumulates on the hearth, covered by a layer of slag. The molten alloy is tapped out from time to time until the slag has increased to such an amount as to require removal. As the normal slag has a high fusion-point, a flux is added to render it more liquid, and the remaining alloy and slag are finally run out through the metal tap-hole. The furnace is then charged anew and the process is repeated.

It is important that the ferrochromium produced should be low in carbon. The amount of carbon in the charge is therefore kept at a minimum. On account of the low percentage of admixed carbon, however, highly-oxidizing gases are evolved in contact with the depending electrode, which is soon consumed and must be replaced. The air also acts rapidly on the hot electrode when the furnace is emptied by the removal of slag. Since the charge is a fairly good conductor of electricity, a thin layer only is maintained around the lower end of the depending electrode to prevent excessive shunting of current to the carbon sides of the furnace under the high applied potential. Much heat is therefore lost by radiation from the zone of reduction through the charge, while the electrode is insufficiently protected from oxidation by the air. This loss of heat greatly decreases the reduction efficiency of the furnace. Furthermore, the slag is not kept at a sufficiently high temperature to permit it to be tapped out, except by adding large amounts of flux, discontinuing the charging of ore and employing the energy of the arc merely to liquefy the slag. The heat losses are also increased by the discontinuous mode of working, both the furnace and the depending electrode cooling down when the furnace is emptied. It is also impracticable to effect a clean separation of the metal and slag by removing them successively through a single tap-hole.

According to the present invention the production of ferrochromium and similar alloys from an electrically-conductive charge is effected in an incandescence furnace by a continuous operation, the charge and its products being employed as a resistance-conductor. The construction of the furnace and the arrangement of the terminal electrodes is preferably such that the density of the current increases through the charge from the point where it is introduced into the furnace to the point of reduction, thereby gradually raising the temperature of the charge. The alloy and slag are tapped from the furnace at different levels.

A suitable incandescence furnace is shown in the accompanying drawing, in which the figure is a vertical axial section.

The furnace comprises a vertical stack 1, of fire-brick or masonry, having a refractory non-conducting lining 2, as of magnesite, siloxicon, or a layer of the previously fused and solidified charge material. The furnace is surrounded by a water-jacket 3 and is closed at the top by a metal water-pan 4. The electrode or electrodes of one polarity (here shown as circular carbon rods 5) extend vertically downward through openings in the top 4, being insulated therefrom by a refractory sleeve 6. A feed-hopper 7 extends centrally through the top. The bottom of the furnace is closed by a carbon hearth 8, which rests on a metal plate 9, having a terminal connection 10, and is thereby constituted the other electrode of the furnace. A tap-hole 11 for metal leads from the bottom of the furnace-chamber, and a tap-hole 12 for slag extends through the furnace-wall above the tap-hole 11. An outlet 13 for waste gases extends from the cover 4. In employing this furnace to carry out the process the electrically-conductive charge—for example, a mixture of chromite, coke, lime, and silica—is fed into the furnace until it surrounds the lower ends of the upper electrodes 5. An electric current is then passed from these electrodes through the charge to the hearth, the charge serving as a resistance-conductor in which the temperature gradually rises toward the hearth by reason of the decreasing cross-section and increasing current density to a point where reduction is effected. The reduced iron and chromium form a molten alloy which drops below the charge sustained by the converging walls of the furnace into the metal receptacle or crucible, which is constituted by the lower end of the furnace. The alloy may be withdrawn from time to time through the lower tap-hole 11. A layer of floating slag may be preferably maintained on the molten alloy beneath the charge, and the excess slag is usually removed from time to time through the upper tap-hole 12. In some cases the violent ebullition in the furnace prevents stratification or clean separation of the metal and slag. They are then preferably both withdrawn through the lower tap-hole and separated in a settling-pot. The voltage and amperage of the electric current are regulated so that the temperature of the charge only rises to the point requisite for reduction at the zone adjacent to the slag. The reduced metals thus quickly separate from and are maintained out of contact with the free carbon in the charge, the resulting alloy therefore being low in carbon. The furnace is operated continuously, the metal and slag being drawn off and fresh materials added as required. A clean separation between the metal and slag is usually effected by tapping them out at different levels and always leaving a certain amount of each within the furnace.

While the furnace shown employs depending carbon electrodes, the upper electrode may consist of a carbon-ring lining in the upper part of the stack, as shown, for example, in United States Patent No. 750,096, granted January 19, 1904, to Alfred H. Cowles. The process has been described in connection with the reduction of chromite, but is applicable to the treatment of any refractory electrically-conductive compound of a metal or metals which it is desired to obtain in a state of substantial freedom from carbon or containing a low or definite percentage of carbon. The process is also applicable to the production of alloys from conductive mixtures of ores or two or more metals—for example, ferrosilicon from a mixture of silica and hematite.

I claim—

1. The process of smelting a charge containing carbon and a compound of a metal or metals which it is desired to obtain in a state of substantial freedom from or low in carbon, which consists in passing an electric current through the charge, acting as a resistance-conductor, separating the reduced metal and maintaining it out of contact with the carbon in the charge, and withdrawing the metal and slag from the furnace, as set forth.

2. The process of smelting a charge containing carbon and a compound of a metal or metals which it is desired to obtain in a state of substantial freedom from or low in carbon, which consists in passing an electric current through the charge, acting as a resistance-conductor, separating the reduced metal and maintaining it out of contact with the carbon in the charge, and separately withdrawing the metal and slag from the furnace, as set forth.

3. The process of smelting a charge containing carbon and a compound of a metal or metals which it is desired to obtain in a state of substantial freedom from or low in carbon, which consists in passing an electric current through the charge, acting as a resistance-conductor, increasing the current density through said charge to a point where reduction is effected, separating the reduced metal and maintaining it out of contact with the carbon in the charge, and withdrawing the metal and slag from the furnace, as set forth.

4. The process of smelting a charge containing carbon and a compound of a metal or metals which it is desired to obtain in a state of substantial freedom from or low in carbon, which consists in passing an electric current through the charge, acting as a resistance-conductor, increasing the current density through said charge to a point where reduction is effected, separating the reduced metal and maintaining it out of contact with the carbon in the charge, and separately withdrawing the metal and slag from the furnace, as set forth.

5. The process of smelting a charge containing carbon and a compound of a metal or metals which it is desired to obtain in a state of substantial freedom from or low in carbon, which consists in passing an electric current through the charge, acting as a resistance-conductor, separating the reduced metal and maintaining it out of contact with the carbon in the charge by an intermediate layer of slag, and withdrawing the metal and slag from the furnace, as set forth.

6. The process of smelting a charge containing carbon and a compound of a metal or metals which it is desired to obtain in a state of substantial freedom from or low in carbon, which consists in passing an electric current through the charge, acting as a resistance-conductor, separating the reduced metal and maintaining it out of contact with the carbon in the charge by an intermediate layer of slag, and separately withdrawing the metal and slag from the furnace, as set forth.

7. The process of smelting a charge containing carbon and a compound of a metal or metals which it is desired to obtain in a state of substantial freedom from or low in carbon, which consists in passing an electric current through the charge, acting as a resistance-conductor, increasing the current density through said charge to a point where reduction is effected, separating the reduced metal and maintaining it out of contact with the carbon in the charge by an intermediate layer of slag, and withdrawing the metal and slag from the furnace, as set forth.

8. The process of smelting a charge containing carbon and a compound of a metal or metals which it is desired to obtain in a state of substantial freedom from or low in carbon, which consists in passing an electric current through the charge, acting as a resistance-conductor, increasing the current density through said charge to a point where reduction is effected, separating the reduced metal and maintaining it out of contact with the carbon in the charge by an intermediate layer of slag, and separately withdrawing the metal and slag from the furnace, as set forth.

9. The process of producing ferrochromium low in carbon, which consists in smelting a charge containing carbon and combined iron and chromium by passing an electric current through said charge, acting as a resistance-conductor, and separating and maintaining the resulting alloy out of contact with the carbon in the charge, as set forth.

10. The process of producing ferrochromium low in carbon, which consists in smelting a charge containing carbon and combined iron and chromium by passing an electric current through said charge, acting as a resistance-conductor, and separating and maintaining the resulting alloy out of contact with the carbon in the charge by an intermediate layer of slag, as set forth.

11. The process of producing ferrochromium low in carbon, which consists in smelting a charge containing carbon and combined iron and chromium by passing an electric current through said charge, acting as a resistance-conductor, separating and maintaining the resulting alloy out of contact with the carbon in the charge by an intermediate layer of slag, and separately withdrawing the alloy and slag from the furnace, as set forth.

12. The process of producing ferrochromium low in carbon, which consists in smelting a charge containing carbon and combined iron and chromium by passing an electric current through said charge, acting as a resistance-conductor, increasing the current density through said charge to a point where reduction is effected, and separating and maintaining the resulting alloy out of contact with the carbon in the charge by an intermediate layer of slag, as set forth.

13. The process of producing ferrochromium low in carbon, which consists in smelting a charge containing carbon and combined iron and chromium by passing an electric current through said charge, acting as a resistance-conductor, increasing the current density through said charge to a point where reduction is effected, and separating and maintaining the resulting alloy out of contact with the carbon in the charge, as set forth.

14. The process of producing ferrochromium low in carbon, which consists in smelting a charge containing carbon and combined iron and chromium by passing an electric current through said charge, acting as a resistance-conductor, increasing the current density through said charge to a point where reduction is effected, separating and maintaining the resulting alloy out of contact with the carbon in the charge, and separately withdrawing the alloy and slag from the furnace, as set forth.

In testimony whereof I affix my signature in presence of two witnesses.

EDGAR F. PRICE.

Witnesses:
HARRY L. NOYES,
F. B. O'CONNOR.